US012756577B2

(12) United States Patent
Yan et al.

(10) Patent No.: US 12,756,577 B2
(45) Date of Patent: Oct. 6, 2026

(54) DATA SHARING METHOD AND ELECTRONIC DEVICE

(71) Applicant: AGRICULTURAL GENOMICS INSTITUTE AT SHENZHEN, CHINESE ACADEMY OF AGRICULTURAL SCIENCES, Shenzhen (CN)

(72) Inventors: Jianbin Yan, Shenzhen (CN); Ran Du, Shenzhen (CN); Ezi Zhao, Shenzhen (CN); Sanwen Huang, Shenzhen (CN)

(73) Assignee: AGRICULTURAL GENOMICS INSTITUTE AT SHENZHEN, CHINESE ACADEMY OF AGRICULTURAL SCIENCES, Shenzhen (CN)

( * ) Notice: Subject to any disclaimer, the term of this patent is extended or adjusted under 35 U.S.C. 154(b) by 616 days.

(21) Appl. No.: 18/202,462

(22) Filed: May 26, 2023

(65) Prior Publication Data

US 2023/0308290 A1 Sep. 28, 2023

Related U.S. Application Data

(63) Continuation of application No. PCT/CN2021/137473, filed on Dec. 13, 2021.

(30) Foreign Application Priority Data

Jan. 18, 2021 (CN) ......................... 202110063362.5

(51) Int. Cl.
*G06F 21/00* (2013.01)
*H04L 9/00* (2022.01)
(Continued)

(52) U.S. Cl.
CPC .......... *H04L 9/3247* (2013.01); *H04L 9/0825* (2013.01); *H04L 9/50* (2022.05)

(58) Field of Classification Search
CPC ....... H04L 9/3247; H04L 9/0825; H04L 9/50; H04L 9/0897; H04L 63/0428;
(Continued)

(56) References Cited

U.S. PATENT DOCUMENTS

2018/0183802 A1* 6/2018 Choyi .................. G06Q 20/383
2020/0084046 A1* 3/2020 Bessonov ............... H04L 9/321
(Continued)

FOREIGN PATENT DOCUMENTS

CN 109460373 A 3/2019
CN 109858228 A 6/2019
(Continued)

OTHER PUBLICATIONS

Xu Zhi-Guo et al.; Cloud Platform Trusted Third Party Platform Data Security Storage Research; Cyberspace Security; Jul. 31, 2016; p. 78, 79, 82; China.
(Continued)

*Primary Examiner* — Kendall Dolly
(74) *Attorney, Agent, or Firm* — Flener IP & Business Law

(57) ABSTRACT

Disclosed is a data sharing method and an electronic device. The data sharing method includes: acquiring encrypted data to be analyzed, selected by a data user, in a data sharing platform; and decrypting, by using a trusted execution program, the encrypted data to be analyzed to obtain decrypted data, and performing, by using the trusted execution program, data analysis on the decrypted data, to obtain a data analysis result of the encrypted data to be analyzed, where the trusted execution program is provided with identity authentication information of the data user set in a built-in manner, and an execution process of the trusted execution program is invisible to the data user, which can ensure the security of shared data in a process of data sharing and improve the efficiency of data analysis.

15 Claims, 6 Drawing Sheets

(51) Int. Cl.
*H04L 9/08* (2006.01)
*H04L 9/32* (2006.01)

(58) Field of Classification Search
CPC ....... H04L 9/083; G06F 16/176; G06F 16/23; G06F 16/27; G06F 21/602; G06F 21/64
See application file for complete search history.

(56) References Cited

U.S. PATENT DOCUMENTS

| | | | |
|---|---|---|---|
| 2020/0210585 A1 | 7/2020 | Thom et al. | |
| 2021/0152343 A1* | 5/2021 | Yu | H04L 9/0618 |
| 2021/0374234 A1* | 12/2021 | Bursell | H04L 9/085 |

FOREIGN PATENT DOCUMENTS

| | | | | |
|---|---|---|---|---|
| CN | 110519049 A | 11/2019 | | |
| CN | 110796267 A | 2/2020 | | |
| CN | 111327643 A | 6/2020 | | |
| CN | 111416704 A | 7/2020 | | |
| CN | 111625869 A | 9/2020 | | |
| CN | 112783847 A | 5/2021 | | |
| WO | 2020119294 A1 | 6/2020 | | |
| WO | WO-2020119258 A1 * | 6/2020 | | H04W 12/03 |

OTHER PUBLICATIONS

First Office Action for Chinese serial No. 202110063362.5; issued Apr. 12, 2022.
International Search Report for PCT/CN2021/137473; issued Mar. 9, 2022.
Written Opinion of the International Searching Authority for PCT/CN2021/137473; issued Mar. 9, 2022.

* cited by examiner

DATA SHARING METHOD AND ELECTRONIC DEVICE

CROSS-REFERENCE TO RELATED APPLICATIONS

This application is a continuation of International Application No. PCT/CN2021/137473 filed on Dec. 13, 2021, which claims priority to Chinese Patent Application 202110063362.5, filed on Jan. 18, 2021. Both applications are incorporated herein by reference in their entireties.

TECHNICAL FIELD

The present application relates to the field of data sharing technologies, and in particular, to a data sharing method and an electronic device.

BACKGROUND

Data sharing can reasonably implement resource allocation, reduce social costs, and create more wealth, and it is an important means of improving a utilization rate of data resource and avoiding wasteful duplication in data collection, storage, and management.

However, although there is a data sharing platform like National Center of Biotechnology Information (NCBI), data is inevitably exposed in a process of data sharing and use, and thus security of data cannot be guaranteed. Although technologies such as Federated Learning and Zero-knowledge Proof provide a possibility of data "available and invisible", in a process of data analysis and use, a data user and a data contributor need to communicate frequently, which affects the efficiency of the data analysis.

SUMMARY

In view of the above, the embodiments of the present application provide a data sharing method and a data sharing apparatus, which can ensure the security of shared data in a process of data sharing and improve the efficiency of data analysis.

According to a first aspect of an embodiment of the present application, a data sharing method includes: acquiring encrypted data to be analyzed, selected by a data user, in a data sharing platform; and decrypting, by using a trusted execution program, the encrypted data to be analyzed to obtain decrypted data, and performing, by using the trusted execution program, data analysis on the decrypted data, to obtain a data analysis result of the encrypted data to be analyzed, where the trusted execution program is provided with identity authentication information of the data user set in a built-in manner, and an execution process of the trusted execution program is invisible to the data user.

In another embodiment of the present application, the trusted execution program is generated by compiling, by the data sharing platform, the identity authentication information of the data user, a service code selected by the data user and an encryption-decryption function, the data sharing platform stores a variety of service codes for selection by the data user, and each service code in the variety of service codes is a code that has been reviewed by a consortium blockchain member and is used to analyze data.

In another embodiment of the present application, the encrypted data to be analyzed is obtained based on a search of the metadata stored in the data sharing platform and meeting a preset data standard, and the metadata includes description information of the encrypted data.

In another embodiment of the present application, the data sharing method further includes: acquiring data list information, in the data sharing platform, corresponding to the encrypted data to be analyzed, where the data list information includes data ID information of the encrypted data to be analyzed; and the acquiring encrypted data to be analyzed, selected by a data user, in a data sharing platform includes: acquiring, based on the data ID information of the encrypted data to be analyzed, the encrypted data to be analyzed by using the trusted execution program.

In another embodiment of the present application, the data sharing method further includes: acquiring data list information, in the data sharing platform, corresponding to the encrypted data to be analyzed, where the data list information includes data summary information about the encrypted data to be analyzed; and performing, based on the data summary information about the encrypted data to be analyzed, data summary verification by using the trusted execution program.

In another embodiment of the present application, the data sharing method further includes: acquiring data list information, in the data sharing platform, corresponding to the encrypted data to be analyzed, where the data list information includes information of a data contributor of the encrypted data to be analyzed; applying, by using the trusted execution program, to a data contributor client for a decryption key of the encrypted data to be analyzed based on the information of the data contributor; and receiving the decryption key returned by the data contributor client. The decrypting, by using a trusted execution program, the encrypted data to be analyzed to obtain decrypted data, and performing, by using the trusted execution program, data analysis on the decrypted data includes: decrypting the encrypted data to be analyzed according to the decryption key returned by the data contributor client, and performing data analysis on the decrypted data.

In another embodiment of the present application, the data sharing method further includes: calling a smart contract by using the trusted execution program, to implement point transfer and ledger update.

According to a second aspect of an embodiment of the present application, a data sharing method includes: receiving, by a data sharing platform, identity authentication information of a data user; and generating, by the data sharing platform, a trusted execution program based on the identity authentication information of the data user, so that the trusted execution program is used to decrypt encrypted data to be analyzed to obtain decrypted data, and perform data analysis on the decrypted data, to obtain a data analysis result of the encrypted data to be analyzed, where the trusted execution program is provided with the identity authentication information of the data user set in a built-in manner, and an execution process of the trusted execution program is invisible to the data user.

In another embodiment of the present application, the data sharing method further includes: determining, by the data sharing platform, a service code selected by the data user, where the data sharing platform stores a variety of service codes for selection by the data user, and each service code in the variety of service codes is a code that has been reviewed by a consortium blockchain member and is used to analyze data. The generating, by the data sharing platform, a trusted execution program based on the identity authentication information of the data user includes: compiling, by the data sharing platform, the identity authentication information of the data user, the service code selected by the data user and an encryption-decryption function to generate the trusted execution program.

In another embodiment of the present application, the data sharing method further includes: receiving, by the data sharing platform, metadata and encrypted data that meet a preset data standard in the data sharing platform and are sent by a data contributor client, where the metadata includes description information of the encrypted data so that the data user performs searching based on the metadata and selects the encrypted data to be analyzed according to a search result.

According to a third aspect of an embodiment of the present application, a data sharing apparatus includes: an acquisition module, configured to acquire encrypted data to be analyzed, selected by a data user, in a data sharing platform; and an analysis module, configured to decrypt, by using a trusted execution program, the encrypted data to be analyzed to obtain decrypted data, and perform, by using the trusted execution program, data analysis on the decrypted data, to obtain a data analysis result of the encrypted data to be analyzed, where the trusted execution program is provided with identity authentication information of the data user set in a built-in manner, and an execution process of the trusted execution program is invisible to the data user.

According to a fourth aspect of an embodiment of the present application, a data sharing apparatus includes: a receiving module, configured to receive, by a data sharing platform, identity authentication information of a data user; and a generation module, configured to generate, by the data sharing platform, a trusted execution program based on the identity authentication information of the data user, so that the trusted execution program is used to decrypt encrypted data to be analyzed to obtain decrypted data, and perform data analysis on the decrypted data, to obtain a data analysis result of the encrypted data to be analyzed, where the trusted execution program is provided with the identity authentication information of the data user set in a built-in manner, and an execution process of the trusted execution program is invisible to the data user.

According to a fifth aspect of an embodiment of the present application, a computer-readable storage medium is provided, on which computer executable instructions are stored. When the executable instructions are executed by a processor, the data sharing method according to any one of above-mentioned embodiments is implemented.

According to a sixth aspect of an embodiment of the present application, an electronic device includes: a processor; and a memory, configured to store processor-executable instructions, where the processor is configured to perform the data sharing method according to any one of above-mentioned embodiments.

According to the technical solutions provided by the embodiments of the present application, the trusted execution program is used to decrypt the encrypted data to be analyzed to obtain decrypted data, and perform data analysis on the decrypted data, and the data analysis result of the encrypted data to be analyzed may be directly obtained without frequent communication with a data contributor in the data analysis process, which can improve the efficiency of data analysis. Moreover, the trusted execution program is provided with the identity authentication information of the data user set in a built-in manner, which may ensure that only an authorized user can interact with data by using the trusted execution program; and the execution process of the trusted execution program is invisible to the data user, which may ensure that the data will not be leaked to the user during the interaction process, so that the security of the shared data can be ensured.

BRIEF DESCRIPTION OF THE DRAWINGS

In order to describe the technical solutions in the embodiments of the present application more clearly, a brief introduction on the drawings to be used to describe the embodiments is given below. Obviously, the drawings in the description below are only some embodiments of the present application, based on which other drawings may also be obtained by those skilled in the art without any inventive efforts.

DETAILED DESCRIPTION OF THE EMBODIMENTS

The technical solutions in the embodiments of the present application are described clearly and completely below with reference to the drawings of the embodiments of the present application. Apparently, the described embodiments are only a part, but not all of the embodiments of the present application. All other embodiments that may be obtained by those skilled in the art based on the embodiments in the present application without any inventive efforts should be within the protection scope of the present application.

Exemplary System

Figure 1:
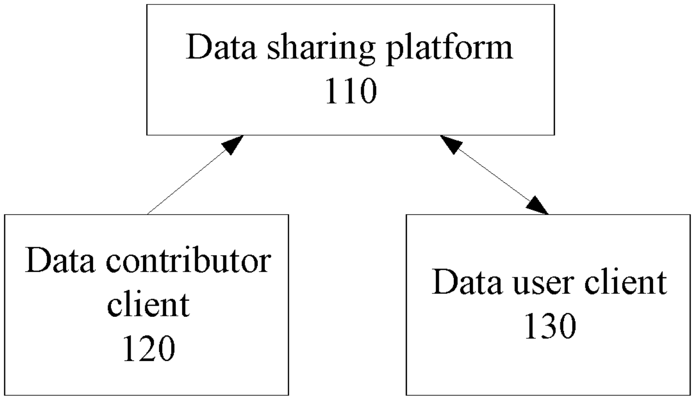
FIG. 1 is a schematic diagram of an applicable scenario of an embodiment of the present application.

FIG. 1 is a schematic diagram of an applicable scenario of an embodiment of the present application. As shown in FIG. 1, the applicable scenario of the embodiment in the present application includes a data sharing platform 110, a data contributor client 120 and a data user client 130.

The data sharing platform 110 is generated based on a blockchain technology, and may provide consortium blockchain services such as member identity authentication, ledger, and smart contract, and the like.

The member identity authentication may be implemented by using an asymmetric encryption method, that is, a public key in a public key/private key pair is used to identify an identity of a user. It should be understood that the method is not specifically limited in the present application. Specifically, a client (e.g., a data contributor client, or a data user client) generates the public key/private key pair and uses the public key to register on a data sharing platform.

The consortium blockchain may use a super ledger technology to implement member management and authentication services. In addition, a super ledger may record information such as decryption key application records of data users, point transfer records obtained after decryption succeeds, and the like. The specific record content in the super ledger is not specifically limited in the present application.

The smart contract specifies a trigger condition for updating the super ledger. The trusted execution program may call the smart contract through a software development kit (SDK) provided by the super ledger.

The data sharing platform 110 is provided with preset data standards for metadata and encrypted data, and stores metadata and encrypted data that meet the preset data standards. Specifically, the data contributor may use the data contributor client 120 to upload metadata and encrypted data that meet the preset data standards to the data sharing platform 110, where the metadata includes description information of the encrypted data. The metadata may be generally disclosed and used as a label for the data user to query or search for data, so that the data user can select required encrypted data based on metadata information.

In addition, the data sharing platform 110 further stores a variety of service codes for selection by the data user, and each service code in the variety of service codes is a code that has been reviewed by a consortium blockchain member and is used to analyze data.

The data user may select a service code stored in the data sharing platform 110 by using the data user client 130 with user identity authentication set in a built-in manner. After the data sharing platform 110 determines the service code selected by the data user, and receives identity authentication information (e.g., public key) of the data user uploaded by the data user client 130, the data sharing platform 110 compiles the identity authentication information of the data user, the service code selected by the data user and the encryption-decryption function to generate a trusted execution program with an execution process invisible to the data user. The trusted execution program may ensure that only an authorized user may interact with the data by using the program, and the data will not be disclosed to users in the interaction process, thereby ensuring the security of the data.

The data user may download the trusted execution program and the selected encrypted data by using the data user client 130, decrypt, by using the trusted execution program, the encrypted data by using local computing power, and perform data analysis on decrypted data to obtain a data analysis result. It should be understood that, after the encrypted data and the trusted execution program are selected, data analysis may alternatively be performed by using computing power of the data sharing platform 110, which is not specifically limited in the present application.

Exemplary Method

Figure 2:
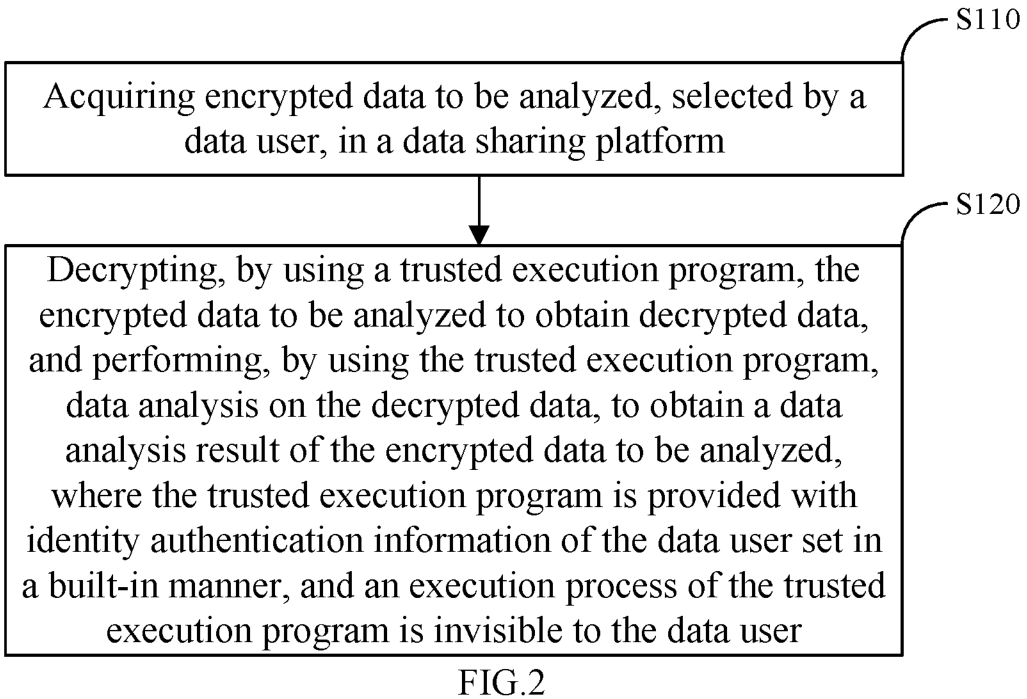
FIG. 2 is a schematic flowchart of a data sharing method according to an embodiment of the present application.

FIG. 2 is a schematic flowchart of a data sharing method according to an embodiment of the present application. The method may be executed by a computer device (e.g., a server). As shown in FIG. 2, the method includes the following steps.

S110: Acquiring encrypted data to be analyzed, selected by a data user, in a data sharing platform.

Shareable encrypted data is stored in the data sharing platform, and the data user may select required encrypted data (namely, the encrypted data to be analyzed) for analysis according to personal needs.

The encrypted data refers to data obtained by encrypting master data with an encryption algorithm. A decryption key is required for decrypting the encrypted data to obtain the master data. The master data may be important data such as scientific research data and medical data. The type of the master data is not specifically limited in the present application. Specifically, the data contributor may independently select an encryption algorithm and use the data contributor client to encrypt the master data. The encryption algorithm may adopt symmetric encryption or asymmetric encryption, which is not specifically limited in the present application.

In another embodiment of the present application, for the security of data, the data contributor may regularly change a key of encrypted data and synchronously update the encrypted data to the data sharing platform, which is not specifically limited in the present application.

The master data is a core of the data and generally needs to be kept confidential. Therefore, in the embodiment of the present application, the data sharing platform only stores the encrypted master data (namely, encrypted data) to provide centralized data transmission services, and the decryption key is stored by the data contributor, so that the security of data may be ensured.

In another embodiment of the present application, before encrypting, the master data and the like may be further reviewed by an expert group composed of consortium blockchain members with an identification ability, so that the quality of shared data may be ensured.

S120: Decrypting, by using a trusted execution program, the encrypted data to be analyzed to obtain decrypted data, and performing, by using the trusted execution program, data analysis on the decrypted data, to obtain a data analysis result of the encrypted data to be analyzed, where the trusted execution program is provided with identity authentication information of the data user set in a built-in manner, and an execution process of the trusted execution program is invisible to the data user.

Specifically, the trusted execution program may decrypt the encrypted data to be analyzed with the decryption key to obtain the master data; and then the trusted execution program performs data analysis on the master data to obtain the data analysis result. It should be understood that an acquisition process of the decryption key and a data analysis process are not specifically limited in the present application.

In an embodiment of the present application, the trusted execution program may be a binary trusted execution program generated after compilation, and an execution process of the trusted execution program is invisible to the data user, to ensure that data will not be leaked to the data user, and also to prevent the trusted execution program from being cracked by reverse engineering, thereby ensuring the security of the shared data.

Specifically, the trusted execution program may be generated, by the data sharing platform, based on the identity authentication information of the data user. The data sharing platform may compile the received identity authentication information (e.g., public key) of the data user into the trusted execution program, to ensure a one-to-one correspondence between an authorized user and a trusted execution program, so that only the authorized user can interact with the data by using the trusted execution program, further ensuring the security of the shared data.

It should be noted that an execution subject of the above-mentioned steps S110 and S120 may be the data sharing platform or the data user client, which is not specifically limited in the present application.

For example, when the execution subject of the above-mentioned steps S110 and S120 is the data sharing platform, the data sharing platform determines the encrypted data to be analyzed according to the selection of the data user, and uses the trusted execution program generated by the data sharing platform to decrypt the encrypted data to be analyzed and performs data analysis on decrypted data to obtain a data analysis result, that is, computing power of the data sharing platform is used to complete the data analysis.

When the execution subject of the above-mentioned steps S110 and S120 is the data user client, the data user client may download the trusted execution program and the encrypted data to be analyzed selected by the data user from the data sharing platform; and decrypt the encrypted data to be analyzed and perform data analysis on decrypted data by using the trusted execution program to obtain a data analysis result. That is, the encrypted data to be analyzed may alternatively be downloaded to the data user client to complete the data analysis by using local computing power.

According to the technical solutions provided by the embodiment of the present application, the trusted execution program is configured to decrypt the encrypted data to be analyzed and perform data analysis on the decrypted data, so that the data analysis result of the encrypted data to be analyzed may be directly obtained without frequent communication with the data contributor in a data analysis process, which can improve the efficiency of data analysis. Moreover, the trusted execution program is provided with the identity authentication information of the data user set in a built-in manner, which may ensure that only an authorized user can interact with data by using the trusted execution program. In addition, the execution process of the trusted execution program is invisible to the data user, which may ensure that the data will not be leaked to the user during the interaction process, so that the security of the shared data can be ensured.

In another embodiment of the present application, the trusted execution program is generated by compiling, by the data sharing platform, the identity authentication information of the data user, the service code selected by the data user and the encryption-decryption function, where the data sharing platform stores a variety of service codes for selection by the data user, and each service code in the variety of service codes is a code that has been reviewed by the consortium blockchain member and is used to analyze data.

The service code refers to a code for data analysis, which may be reviewed offline by the consortium blockchain member to ensure that its execution process is invisible to the data user and other functions that leak decrypted data do not exist.

The service code may be the code of the biological, chemical and other scientific research data analysis methods. Moreover, the service code may be the code of the general data analysis method, or the code developed to meet personalized data analysis needs of a user. It should be understood that the service code is not specifically limited in the present application.

Specifically, the user may slide up and down in a service code list on a user interface of the data user client to select a required service code name, or use a service code searching function to quickly select a required service code by entering the required service code name. It should be understood that the manner for selection is not specifically limited in the present application.

After the data user selects the required service code, the data user client is configured to upload the identity authentication information (e.g., a public key) of the data user to the data sharing platform; and the data sharing platform receives the identity authentication information of the data user, and compiles the service code selected by the data user, the identity authentication information of the data user and the encryption-decryption function to generate the trusted execution program.

It should be noted that the service code may be uploaded to the data sharing platform by a service code developer. It should be understood that the data user or the data contributor may also be a service code developer, which is not specifically limited in the present application.

In another embodiment of the present application, the encrypted data to be analyzed is obtained based on a search of metadata stored in the data sharing platform and meeting a preset data standard, and the metadata includes description information of encrypted data.

Specifically, the data contributor may upload the metadata corresponding to the encrypted data to the data sharing platform while uploading the encrypted data to the data sharing platform by using the data contributor client.

The metadata is information for describing the encrypted data. The metadata may be generally disclosed, and may be used as a label for the data user to query or search for data. The data user may search data anonymously on the data sharing platform, and select the required encrypted data according to searched metadata information.

The data sharing platform is provided with a preset data standard for metadata. The data standard may be a data standard for a specific field and established by experts in the field, and specifies content of the metadata and its value range. The data contributor needs to make metadata according to the standard and uploads the metadata to the data sharing platform by using the data contributor client. In an embodiment of the present application, the metadata information may be information shown in Table 1, and it should be understood that a specific data standard and data content of the metadata are not specifically limited in the present application.

TABLE 1

| Attribute classification | Attribute | Type | Description |
|---|---|---|---|
| metadata attribute | attribute 1 | value | used for search |
| | attribute 2 | string | |
| | attribute 3 | text | |
| | . . . | . . . | |
| | attribute N | enumeration | |

According to the technical solutions provided by the embodiment of the present application, the data user cannot view the encrypted data directly, but selects the required encrypted data by searching metadata, so that the security of the encrypted data can be ensured.

In another embodiment of the present application, in addition to the encrypted data and metadata, system attribute information corresponding to the encrypted data may also be stored in the data sharing platform.

The system attribute information specifies a use rule of the encrypted data. The system attribute information may include a unique data ID of the encrypted data, the data contributor, points to be consumed for data use and/or a data summary used to verify the data (e.g., an MD5 value of encrypted data, an MD5 value of decrypted data, and an MD5 value of decryption key), as shown in Table 2. It should be understood that Table 2 is only an exemplary description, and the system attribute information is not specifically limited in the present application.

TABLE 2

| Attribute classification | Attribute | Type | Description |
|---|---|---|---|
| system attribute | data ID | GUID | as a key for a piece of data |
| | data contributor | enumeration | indicate data source |
| | points to be consumed for data use | value | points to be transferred for data use |
| | data summary of encrypted data | MD5value | encrypted data verification |
| | data summary of decrypted data | MD5value | decrypted data verification |
| | data summary of decryption key | MD5value | decryption key verification |

The data summary is a string used to represent uniqueness of a data file. The string is generated by a data summary algorithm, any change to the data file will result in a different data summary generated by the data summary algorithm, and common data summary includes MD5, SHA1, or the like. The specific type of the data summary is not specifically limited in the present application.

In another embodiment of the present application, after the data user selects the required encrypted data to be analyzed, the method further includes: acquiring data list information, in the data sharing platform, corresponding to the encrypted data to be analyzed, where the data list information includes data ID information of the encrypted data to be analyzed. The acquiring encrypted data to be analyzed, selected by a data user, in a data sharing platform includes: acquiring, based on the data ID information of the encrypted data to be analyzed, the encrypted data to be analyzed by using the trusted execution program.

For example, the data user downloads the data list information (e.g., Table 2) from the data sharing platform by using the data user client; and the trusted execution program in the data user client may download the encrypted data to be analyzed from the data sharing platform based on the data ID information in the data list information.

Figure 3:
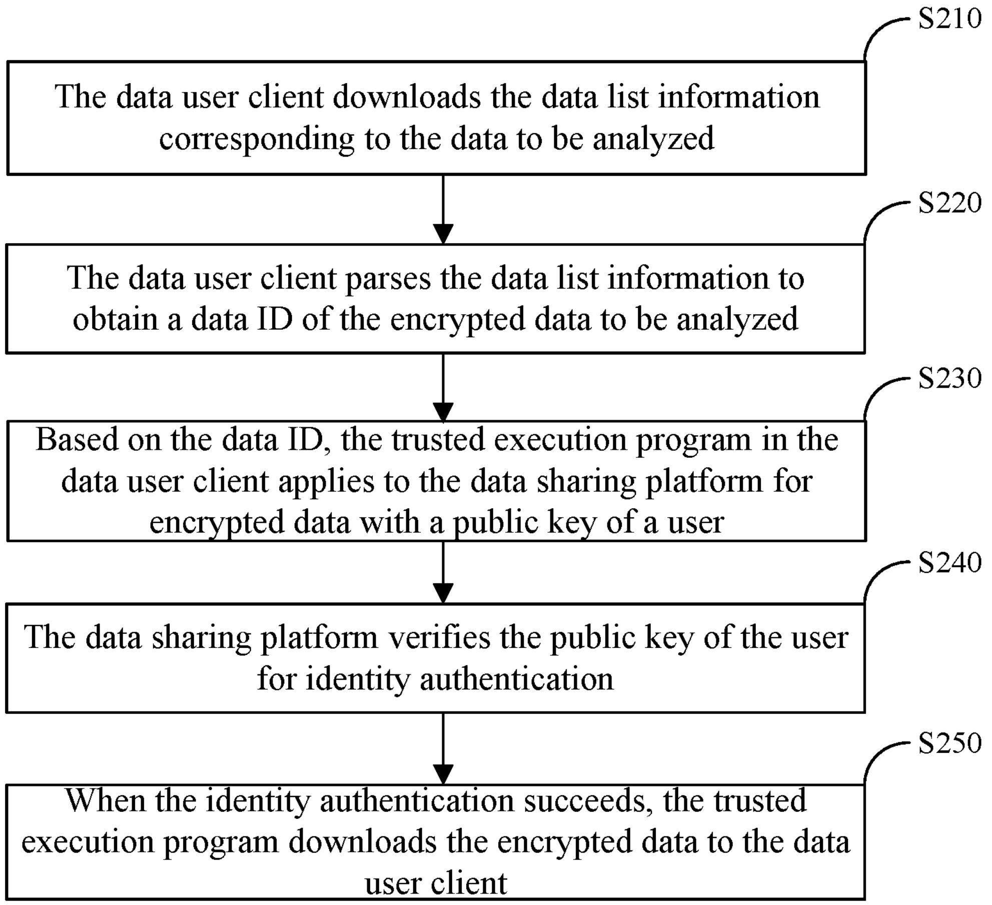
FIG. 3 is a schematic flowchart of acquiring encrypted data to be analyzed according to an embodiment of the present application.

Specifically, as shown in FIG. 3, an acquisition process of the encrypted data to be analyzed may include the following steps.

S210: The data user client downloads the data list information corresponding to the encrypted data to be analyzed.

It should be noted that this step may not require identity authentication, which is not limited in the present application.

S220: The data user client parses the data list information to obtain a data ID of the encrypted data to be analyzed.

S230: Based on the data ID, the trusted execution program in the data user client applies to the data sharing platform for encrypted data with a public key of a user.

S240: The data sharing platform verifies the public key of the user for identity authentication.

S250: When the identity authentication succeeds, the trusted execution program downloads the encrypted data to the data user client.

Then, the data user client may decrypt the encrypted data and perform data analysis on the decrypted data by using the trusted execution program.

It should be noted that when data analysis is completed by the computing power of the data sharing platform, the trusted execution program during data sharing may be used to acquire the encrypted data to be analyzed based on the data ID information in the data list information, which is not specifically limited in the present application.

In another embodiment of the present application, the data sharing method further includes: acquiring data list information, in the data sharing platform, corresponding to the encrypted data to be analyzed, where the data list information includes data summary information about the encrypted data to be analyzed; and performing, according to the data summary information about the encrypted data to be analyzed, data summary verification by using the trusted execution program.

For example, the data user downloads the data list information (e.g., Table 2) from the data sharing platform by using the data user client, and the trusted execution program in the data user client may perform the data summary verification on obtained data based on the data summary information in Table 2 to ensure the accuracy of the data.

For example, after the trusted execution program downloads the encrypted data from the data sharing platform, the encrypted data may be verified based on data summary (e.g., MD5 value) of the encrypted data in the data list information.

After the trusted execution program decrypts the encrypted data, the decrypted data may be verified based on data summary (e.g., MD5 value) of the decrypted data in the data list information.

After the trusted execution program obtains a decryption key, the decryption key may be verified based on data summary (e.g., MD5 value) of the decryption key in the data list information. By verifying the decryption key, a problem that data is unavailable due to an incorrect decryption key may be avoided. In another embodiment of the present application, key application records may further be written into a blockchain for storage, which is not limited in the present application.

According to the technical solution provided by the embodiment of the present application, the accuracy of the data can be guaranteed by verifying the relevant data based on the data summary by using the trusted execution program.

In another embodiment of the present application, the data sharing method further includes: acquiring data list information, in the data sharing platform, corresponding to the encrypted data to be analyzed, where the data list information includes information of a data contributor of the encrypted data to be analyzed; applying, by using the trusted execution program, to a data contributor client for a decryption key of the encrypted data to be analyzed based on the information of the data contributor; and receiving the decryption key returned by the data contributor client. The decrypting, by using a trusted execution program, the encrypted data to be analyzed to obtain decrypted data, and performing, by using the trusted execution program, data analysis on the decrypted data includes: decrypting the encrypted data to be analyzed according to the decryption key returned by the data contributor client, and performing data analysis on the decrypted data.

Figure 4:
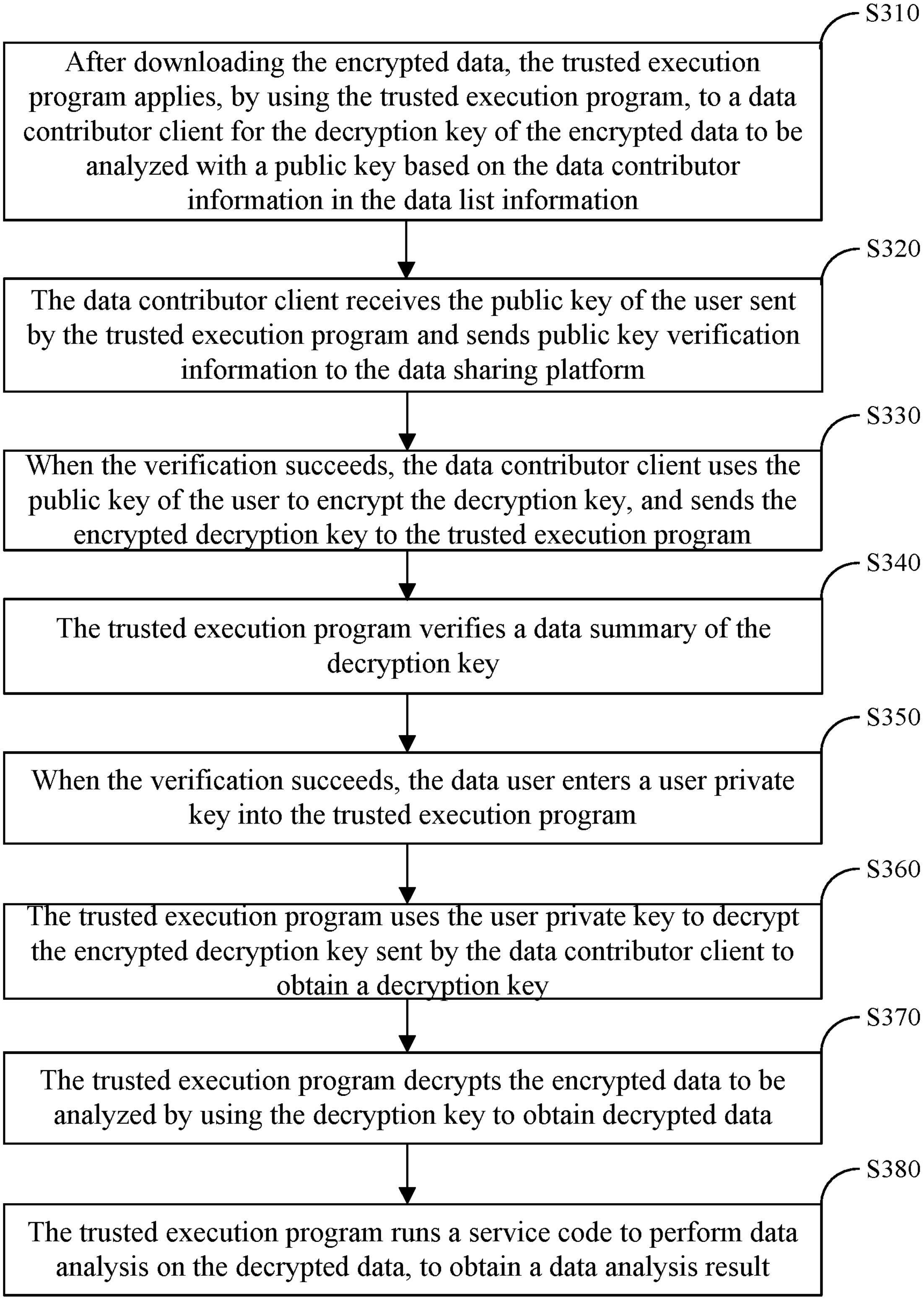
FIG. 4 is a schematic flowchart of decrypting encrypted data to be analyzed according to an embodiment of the present application.

Specifically, as shown in FIG. 4, a decryption process for the encrypted data to be analyzed may include the following steps.

S310: After downloading the encrypted data, the trusted execution program applies, by using the trusted execution program, to a data contributor client for the decryption key of the encrypted data to be analyzed with a public key based on the data contributor information in the data list information.

In an embodiment of the present application, a decryption key application record of a data user may be recorded in a blockchain ledger.

S320: The data contributor client receives the public key of the user sent by the trusted execution program and sends public key verification information to the data sharing platform.

S330: When the verification succeeds, the data contributor client uses the public key of the user to encrypt the decryption key, and sends the encrypted decryption key to the trusted execution program.

S340: The trusted execution program verifies a data summary of the decryption key.

Specifically, the trusted execution program may verify the decryption key based on the data summary of the decryption key in the data list information.

When the verification fails, there may be two cases. (1) The decryption key sent by the data contributor client is incorrect; in this case, a reminder message may be sent to the data contributor client to make the data contributor client resend the decryption key. (2) After the data contributor regularly changes the key of the encrypted data, the data summary of the encrypted data in the data sharing platform is not updated synchronously; in this case, the data contributor needs to update the data summary of the encrypted data and the encrypted data in the data sharing platform, and then the trusted execution program re-downloads the encrypted data and the data list information corresponding to the encrypted data in the data sharing platform.

S350: When the verification succeeds, the data user enters a user private key into the trusted execution program.

S360: The trusted execution program uses the user private key to decrypt the encrypted decryption key sent by the data contributor client to obtain a decryption key.

S370: The trusted execution program decrypts the encrypted data to be analyzed by using the decryption key to obtain decrypted data.

S380: The trusted execution program runs a service code to perform data analysis on the decrypted data, to obtain a data analysis result.

It should be noted that the process of downloading the encrypted data and decrypting the encrypted data by the trusted execution program may be separated, that is, the encrypted data may be downloaded in advance and then decrypted when being used; or the encrypted data is decrypted immediately after being downloaded; or the like. It should be understood that the process is not specifically limited in the present application.

In another embodiment of the present application, the data sharing method further includes: calling a smart contract by using the trusted execution program, to implement point transfer and ledger update.

In an embodiment of the present application, points are used to implement income transfer in a process of data use. Specifically, the smart contract may be used to handle a point transfer process used after users successfully access the encrypted data. For example, the trusted execution program may call the smart contract to transfer the points from a data user account to at least one data contributor account; to transfer the points from the data user account to an account of a consortium blockchain member that reviews metadata and master data; and/or to transfer the points from a service code developer account to an account of a consortium blockchain member that reviews service codes. It should be understood that a point allocation rule is not specifically limited in the present application. In addition, the above description is only illustrative, and a point transfer target is not specifically limited in the present application.

The smart contract may adopt a form of one-to-one or one-to-many, for example, points are transferred from one data user account to one or a plurality of data contributor accounts. In addition, the smart contract may alternatively adopt a form of many-to-one, for example, points are transferred from a plurality of data user accounts to one data contributor account. It should be understood that the form is not specifically limited in the present application.

In an embodiment of the present application, a point transfer record may be recorded in the blockchain ledger.

According to the technical solution provided by the embodiment of the present application, the trusted execution program calls the smart contract to implement point transfer and ledger update, so that transparency of a data sharing process and sharing incentive can be implemented in combination with the blockchain technology.

Figure 5:
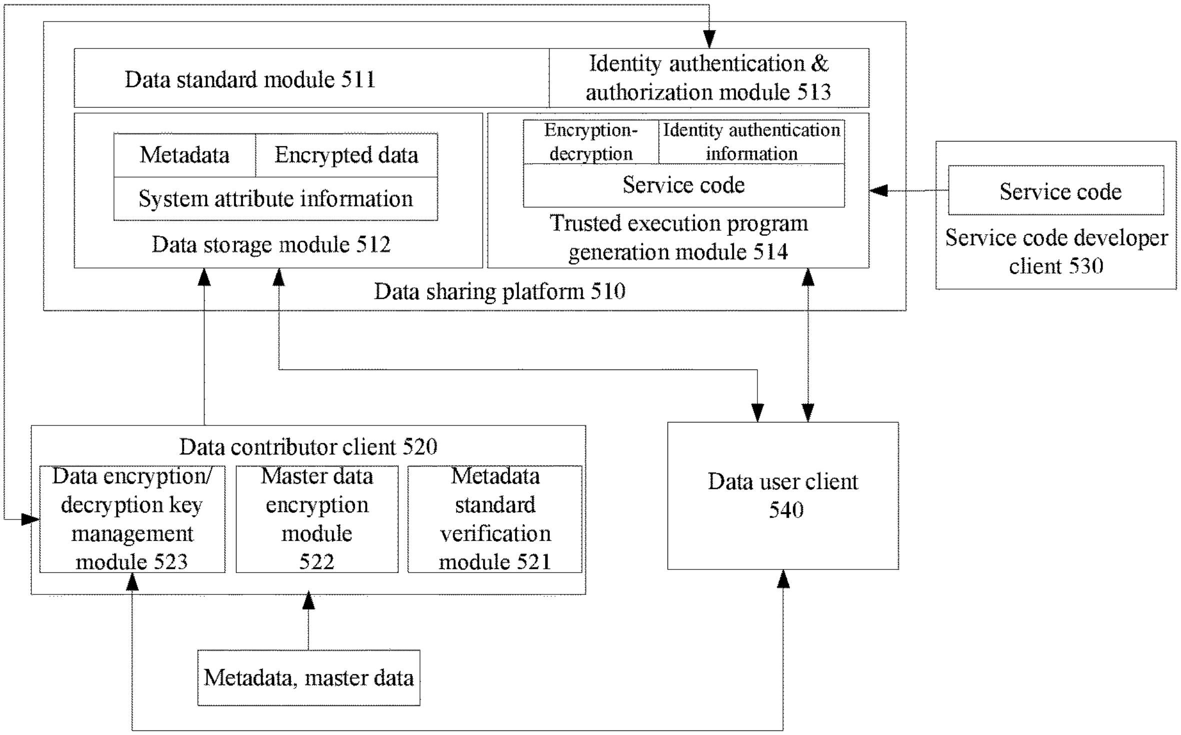
FIG. 5 is a schematic diagram of a data sharing system according to an embodiment of the present application.

FIG. 5 is a schematic diagram of a data sharing system according to an embodiment of the present application. The data sharing system includes a data sharing platform 510, a data contributor client 520, a service code developer client 530, and a data user client 540. A data sharing process will be described in detail with reference to FIG. 5.

As shown in FIG. 5, the data contributor provides metadata and master data. The data contributor may select a consortium blockchain member to review the metadata and the master data offline to ensure the quality of shared data.

After the consortium blockchain member reviews the metadata and the master data, the data contributor uses the data contributor client 520 to package the master data and generate a data summary (e.g., MD5 value). Moreover, the data contributor may also reach an agreement with the consortium blockchain member who is involved in a review process on a point allocation rule, namely, a quantity of transferred points allocated to the consortium blockchain member each time when a data user uses the data. Moreover, information about the consortium blockchain member, the agreed point allocation rule and the data summary may be written into a blockchain ledger.

A metadata standard verification module 521 in the data contributor client 520 may call a preset data standard in the data standard module 511 to verify the metadata, and after verification based on the data standard succeeds, the metadata may be uploaded to the data sharing platform 510.

A master data encryption module 522 in the data contributor client 520 may encrypt packed master data to generate encrypted data.

Data encryption/decryption key management module 523 in the data contributor client 520 may manage a decryption key of the encrypted data.

It should be noted that the data contributor may regularly change the key of the encrypted data by using the data contributor client 520, and synchronously update the encrypted data and data summary to the data sharing platform 510, to ensure the security of the data.

The data contributor uploads the encrypted data and the metadata to the data sharing platform 510 by using the data contributor client 520 with user identity authentication set in a built-in manner, and uploads system attribute information of the encrypted data, e.g., points required for data use; a data summary of packaged data (also referred to as data summary of decrypted data) to prevent the data contributor from tampering data; a data summary of the encrypted data; a data summary of decryption key, and the like, which are not specifically limited in the present application. The data contributor may specify that only the trusted execution program which has been reviewed by a specific consortium blockchain member can access data.

In addition, a service code developer develops compilable service code according to the data standard and sample data specified by the data sharing platform 510, and submits the developed service code to the data sharing platform 510 by using the service code developer client 530.

Moreover, for a specific field, a data standard of the field (e.g., metadata standard, and encrypted data standard) is preset in the data standard module 511 of the data sharing platform 510, and data provided by the data contributor should meet this standard. The data sharing platform 510 is created based on the blockchain technology and may provide consortium blockchain services such as member identity authentication, ledger, smart contract, and the like.

The metadata, the encrypted data and the system attribute information (e.g., Table 1 above) uploaded by the data contributor client 520 are stored in a data storage module 512 of the data sharing platform 510. The data sharing platform 510 may provide a centralized storage and download function for the encrypted data, so that a data transmission limit of the blockchain network can be avoided, and the data transmission efficiency can be speeded up.

In addition, a data search website is established on the data sharing platform 510, so that data submitted by the data contributor may be conveniently searched by the data user. The data user may select required encrypted data by searching metadata on the data search web site.

An identity authentication & authorization module 513 of the data sharing platform 510 may provide identity authentication & authorization services. A consortium blockchain participant (e.g., the data contributor, the data user, the service code developer, etc.) may submit identity authentication information to the data sharing platform 510, and the data sharing platform 510 synchronizes the identity authentication information to each node/client.

The data sharing platform 510 provides search and review services for the service code. That is, the data sharing platform 510 may invite a consortium blockchain member to review and test the security of the service code (for a code with confidentiality requirements, the service code developer may specify a consortium blockchain member to perform review), to ensure that output will not leak the input data. After the service code is reviewed, review information may be written into the blockchain ledger (e.g., the service code ID; the consortium blockchain member involved in the review process; and the point allocation rule between the service code developer and the code reviewer used after the data user calls the service code and agreed by the service code developer and the code reviewer).

A trusted execution program generation module 514 of the data sharing platform 510 may generate a binary trusted execution program. Specifically, after the data user selects the required service code, the trusted execution program submits the identity authentication information (public key) of the data user, and the trusted execution program generation module 514 compiles the identity authentication information of the data user, the encryption-decryption function, and the service code selected by the data user into a trusted execution program and sends the trusted execution program to the data user client 540. When the data user accesses the data by using the trusted execution program, the identity authentication information set in the trusted execution program in a built-in manner is used as a label of the data user.

In another embodiment of the present application, the data sharing platform 510 may further generate a trusted execution program list for the generated trusted execution programs, which is not specifically limited in the present application.

After selecting the required encrypted data from the data search website provided by the data sharing platform 510, the data user downloads a data list corresponding to the encrypted data by using the data user client 540 with identity authentication information set in a built-in manner. Data list information may include the data ID, the data contributor, the points to be consumed for data use, the MD5 value of encrypted data, the MD5 value of decrypted data, the MD5 value of decrypted key, and the like, which is not specifically limited in the present application.

The data user selects the service code on the data sharing platform 510 by using the data user client 540, and uploads personal identity authentication information by using the data user client 540, so that the data sharing platform 510 compiles the identity authentication information of the data user, the encryption-decryption function, and the service code selected by the data user into a trusted execution program, and sends the trusted execution program to the data user client 540.

The data user client 540 uses the obtained trusted execution program to download encrypted data, decrypt the encrypted data, perform data analysis on the decrypted data, and output a data analysis result. Specifically, execution steps of the trusted execution program in the data user client 540 are as follows.

The trusted execution program parses the data list information, downloads the encrypted data according to the data ID in the data list information, and verifies the integrity of data based on the MD5 value of encrypted data in the data list information.

When the verification fails, the encrypted data and the data list information may be downloaded again from the data sharing platform.

When the verification succeeds, the trusted execution program may apply for the decryption key of the encrypted data to be analyzed, from the data encryption/decryption key management module 523 of the data contributor client 520 with the public key and based on data contributor information in the data list information. The data contributor client 520 receives the public key sent by the trusted execution program, and sends public key verification information to the identity authentication & authorization module 513 of the data sharing platform 510. When verification succeeds, the data contributor client 520 encrypts the decryption key with the public key and sends the encrypted decryption key to the trusted execution program (a gRPC network at the lower layer of the super ledger provides a function of transmitting the decryption key). The trusted execution program verifies the decryption key based on the MD5 value of decryption key in the data list information.

Verification information may be written into the blockchain ledger, and the content may be "MD5 value of the received decryption key, MD5 value registered in the platform", and it should be understood that the content of the verification information is not specifically limited in the present application. By verifying the decryption key, a problem that data is unavailable due to an incorrect decryption key may be avoided; and by writing the verification information into the blockchain, the key application record may be saved, and this process may not involve the point transfer.

After verification of the decryption key succeeds, the trusted execution program decrypts the encrypted data with the decryption key, to obtain the decrypted data; and the decrypted data is verified based on the MD5 value of the decrypted data, and if the decryption succeeds, point transfer information is written into the blockchain ledger. A structure of the ledger may be as follows:

```
{
Public key of an applicant:
MD5 value of data list applied by the applicant:
Point earned by contributor 1:
Point earned by contributor 2:
. . .
Point earned by contributor n:
Time stamp:
}
```

In addition, the data user client 540 may send verified data list information to the data sharing platform 510, and attach the identity authentication and time stamp. The data sharing platform 510 may store a data access record and write a data summary of the data access record into the blockchain ledger.

The service code in the trusted execution program uses the decrypted data as input for data analysis, and provides the data analysis result as output to the data user. Call information of the service code may be written into the blockchain ledger. The trusted execution program may implement point transfer from a data user account to a service code developer account by calling the smart contract. Whether the point transfer is written into the blockchain ledger is determined by the service code developer during reviewing service code, which is not specifically limited in the present application.

It should be noted that the data contributor client 520, the service code developer client 530 and the data user client 540 may be either an App client or a web client, which is not specifically limited in the present application. The data contributor and the data user may alternatively be a service code developer; and the data contributor client 520 and the data user client 540 may alternatively be a service code developer client 530, which is not specifically limited in the present application.

According to the technical solutions provided by the embodiment of the present application, a problem that the blockchain network is unsuitable for big data storage and transmission is avoided by providing centralized secure data storage and download functions by the data sharing platform; a standardized metadata search function is provided by the data sharing platform to facilitate the data user to search for the required data; the security of data may be ensured by using the data contributor client to locally encrypt and save the key; and the accuracy of the data to be used may be ensured by verifying the data summary by using the trusted execution program. No data leakage or no reverse unraveling may be implemented in the data sharing process by generating the binary trusted execution program; and the transparency of data sharing process and intelligent sharing and incentive may be implemented by the blockchain technology. In the embodiment of the present application, trusted execution program is organically combined with the consortium blockchain, simplifying the manual operation in the data sharing process, improving the sharing security and convenience, and improving the user experience.

Figure 6:
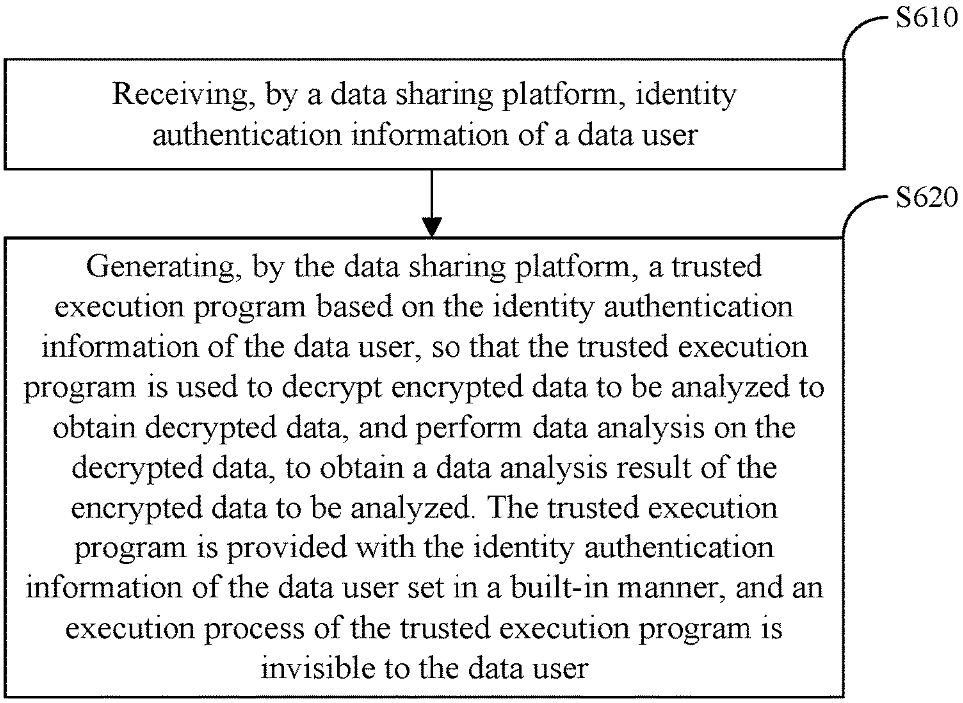
FIG. 6 is a schematic flowchart of a data sharing method according to another embodiment of the present application.

FIG. 6 shows a schematic flowchart of a data sharing method according to another embodiment of the present application. As shown in FIG. 6, the method includes the following steps.

S610: Receiving, by a data sharing platform, identity authentication information of a data user.

S620: Generating, by the data sharing platform, a trusted execution program based on the identity authentication information of the data user, so that the trusted execution program is used to decrypt encrypted data to be analyzed to obtain decrypted data, and perform data analysis on the decrypted data, to obtain a data analysis result of the encrypted data to be analyzed. The trusted execution program is provided with the identity authentication information of the data user set in a built-in manner, and an execution process of the trusted execution program is invisible to the data user.

According to the technical solutions provided by the embodiment of the present application, a trusted execution program is generated to decrypt the encrypted data to be analyzed and to perform data analysis on decrypted data, so that the data analysis result of the encrypted data to be analyzed may be directly obtained without frequent communication with the data contributor in a data analysis process, which can improve the efficiency of data analysis. In addition, the trusted execution program is provided with identity authentication information of the data user set in a built-in manner, which may ensure that only the authorized user can interact with data by using the trusted execution program. Moreover, the execution process of the trusted execution program is invisible to the data user, which may ensure that the data will not be leaked to the user during the interaction process, so that the security of the shared data can be ensured.

In another embodiment of the present application, the data sharing method further includes: determining, by the data sharing platform, a service code selected by the data user, where the data sharing platform stores a variety of service codes for selection by the data user, and each service code in the variety of service codes is a code that has been reviewed by a consortium blockchain member and is used to analyze data. The generating, by the data sharing platform, a trusted execution program based on the identity authentication information of the data user includes: compiling, by the data sharing platform, the identity authentication information of the data user, the service code selected by the data user and an encryption-decryption function to generate the trusted execution program.

In another embodiment of the present application, the data sharing method further includes: receiving, by the data sharing platform, metadata and encrypted data that meet a preset data standard in the data sharing platform and are sent by a data contributor client, where the metadata includes description information of the encrypted data, so that the data user performs searching based on the metadata and selects the encrypted data to be analyzed according to a search result.

All of the above-mentioned optional technical solutions may be randomly combined to form an optional embodiment of the present application, and details are not described herein.

Exemplary Apparatus

The followings are the apparatus embodiments of the present application, which may be used to implement the method embodiments of the present application. For details not disclosed in the apparatus embodiments of the present application, please refer to the method embodiments of the present application.

Figure 7:
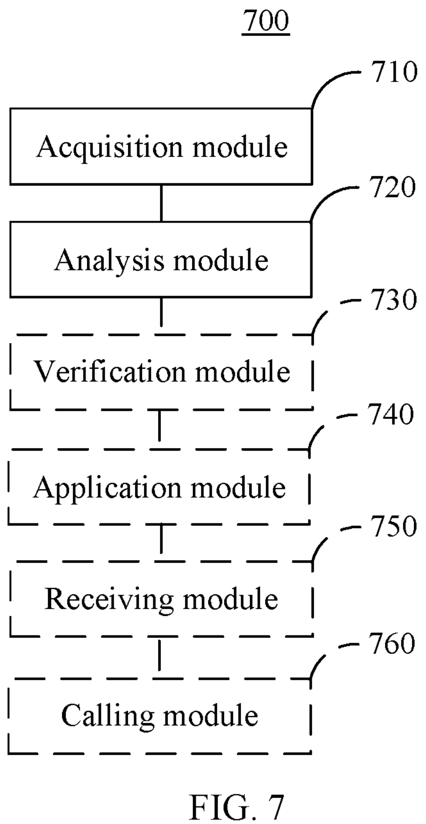
FIG. 7 is a block diagram of a data sharing apparatus according to an embodiment of the present application.

FIG. 7 is a block diagram of a data sharing apparatus according to an embodiment of the present application. As shown in FIG. 7, the data sharing apparatus 700 includes an acquisition module 710 and an analysis module 720.

The acquisition module 710 is configured to acquire encrypted data to be analyzed, selected by a data user, in a data sharing platform.

The analysis module 720 is configured to decrypt, by using a trusted execution program, the encrypted data to be analyzed to obtain decrypted data, and perform, by using the trusted execution program, data analysis on the decrypted data, to obtain a data analysis result of the encrypted data to be analyzed, where the trusted execution program is provided with identity authentication information of the data user set in a built-in manner, and an execution process of the trusted execution program is invisible to the data user.

According to the technical solutions provided by the embodiment of the present application, the trusted execution program is used to decrypt the encrypted data to be analyzed to obtain decrypted data, and perform data analysis on the decrypted data, and the data analysis result of the encrypted data to be analyzed may be directly obtained without frequent communication with a data contributor in the data analysis process, which can improve the efficiency of data analysis. Moreover, the trusted execution program is provided with the identity authentication information of the data user set in a built-in manner, which may ensure that only an authorized user can interact with data by using the trusted execution program; and the execution process of the trusted execution program is invisible to the data user, which may ensure that the data will not be leaked to the user during the interaction process, so that the security of the shared data can be ensured.

In another embodiment of the present application, the above-mentioned trusted execution program is generated by compiling, by the data sharing platform, the identity authentication information of the data user, a service code selected by the data user and an encryption-decryption function. The data sharing platform stores a variety of service codes for selection by the data user, and each service code in the variety of service codes is a code that has been reviewed by a consortium blockchain member and is used to analyze data.

In another embodiment of the present application, the encrypted data to be analyzed is obtained based on a search of metadata stored in the data sharing platform and meeting a preset data standard, and the metadata includes description information of the encrypted data.

In another embodiment of the present application, the acquisition module 710 is configured to acquire data list information, in the data sharing platform, corresponding to the encrypted data to be analyzed, where the data list information includes data ID information of the encrypted data to be analyzed; and acquire, based on the data ID information of the encrypted data to be analyzed, the encrypted data to be analyzed by using the trusted execution program.

In another embodiment of the present application, the acquisition module 710 is configured to acquire data list information, in the data sharing platform, corresponding to the encrypted data to be analyzed, where the data list information includes data summary information of the encrypted data to be analyzed. The above-mentioned data sharing apparatus further includes a verification module 730, configured to perform, according to the data summary information about the encrypted data to be analyzed, data summary verification by using the trusted execution program.

In another embodiment of the present application, the acquisition module 710 is configured to acquire data list information, in the data sharing platform, corresponding to the encrypted data to be analyzed, where the data list information includes information of a data contributor of the encrypted data to be analyzed. The above-mentioned data sharing apparatus further includes an application module 740, configured to apply, by using the trusted execution program, to a data contributor client for a decryption key of the encrypted data to be analyzed based on the information of the data contributor, and a receiving module 750, configured to receive the decryption key returned by the data contributor client, and the analysis module is configured to decrypt the encrypted data to be analyzed according to the decryption key returned by the data contributor client, and perform data analysis on the decrypted data.

In another embodiment of the present application, the above-mentioned data sharing apparatus further includes a calling module 760, configured to call a smart contract by using the trusted execution program, to implement point transfer and ledger update.

Figure 8:
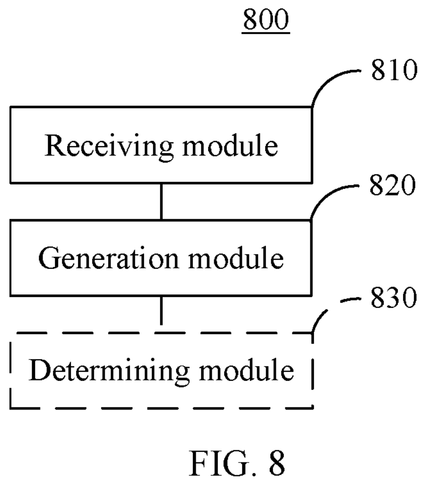
FIG. 8 is a block diagram of a data sharing apparatus according to another embodiment of the present application.

FIG. 8 is a block diagram of a data sharing apparatus according to another embodiment of the present application. As shown in FIG. 8, the data sharing apparatus 800 includes a receiving module 810 and a generation module 820.

The receiving module 810 is configured to receive, by a data sharing platform, identity authentication information of a data user.

The generation module 820 is configured to generate, by the data sharing platform, a trusted execution program based on the identity authentication information of the data user, so that the trusted execution program is used to decrypt encrypted data to be analyzed to obtain decrypted data, and perform data analysis on the decrypted data, to obtain a data analysis result of the encrypted data to be analyzed, where the trusted execution program is provided with the identity authentication information of the data user set in a built-in manner, and an execution process of the trusted execution program is invisible to the data user.

According to the technical solutions provided by the embodiments of the present application, a trusted execution program is generated and the trusted execution program is used to decrypt the encrypted data to be analyzed and perform data analysis on the decrypted data, so that the data analysis result of the encrypted data to be analyzed may be directly obtained without frequent communication with a data contributor in the data analysis process, which can improve the efficiency of data analysis. Moreover, the trusted execution program is provided with the identity authentication information of the data user set in a built-in manner, which may ensure that only an authorized user can interact with data by using the trusted execution program. In addition, the execution process of the trusted execution program is invisible to the data user, which may ensure that the data will not be leaked to the user during the interaction process, so that the security of the shared data can be ensured.

In another embodiment of the present application, the data sharing apparatus further includes a determining module 830, configured to determine, by the data sharing platform, a service code selected by the data user, where the data sharing platform stores a variety of service codes for selection by the data user, and each service code in the variety of service codes is a code that has been reviewed by a consortium blockchain member and is used to analyze data. The generation module 820 is configured to compile, by the data sharing platform, the identity authentication information of the data user, the service code selected by the data user and an encryption-decryption function to generate the trusted execution program.

In another embodiment of the present application, the receiving module 810 is configured to receive, by the data sharing platform, metadata and encrypted data that meet a preset data standard in the data sharing platform and are sent by a data contributor client, where the metadata includes description information of the encrypted data, so that the data user performs searching based on the metadata and selects the encrypted data to be analyzed according to a search result.

For the detailed implementation processes of the function and role of each module in the above-mentioned apparatuses, refer to the implementation processes of the corresponding steps in the above-mentioned methods, which will not be repeated herein.

Exemplary Electronic Device

Figure 9:
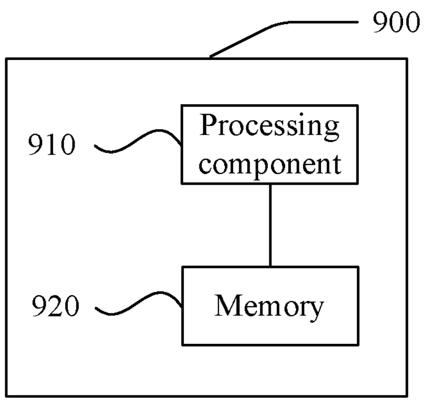
FIG. 9 is a block diagram of an electronic device according to an embodiment of the present application.

FIG. 9 is a block diagram of an electronic device 900 according to an embodiment of the present application.

Referring to FIG. 9, the electronic device 900 includes: a processing component 910 that further includes one or more processors, and memory resources represented by a memory 920 for storing instructions executable by the processing component 910, such as application programs. The application programs stored in the memory 920 may include one or more modules, and each module is corresponding to a set of instructions. Further, the processing component 910 is configured to execute the instructions to perform the above-mentioned data sharing method.

The electronic device 900 may further include a power supply component configured to perform power management of the electronic device 900, wired or wireless network interface(s) configured to connect the electronic device 900 to a network, and an input/output (I/O) interface. The electronic device 900 may operate based on an operating system stored in the memory 920, such as Windows Server™, Mac OS X™, Unix™, Linux™, FreeBSD™, or the like.

A non-temporary computer-readable storage medium, when instructions in the storage medium are executed by a processor of the above-mentioned electronic device 900, cause the above-mentioned electronic device 900 to perform the above-mentioned data sharing method.

Persons skilled in the art may realize that, units and algorithm steps of examples described in combination with the embodiments disclosed here can be implemented by electronic hardware, or the combination of computer software and electronic hardware. Whether these functions are executed by hardware or software depends on particular applications and design constraint conditions of the technical solution. Persons skilled in the art may use different methods to implement the described functions for each particular application, but it should not be considered that the implementation goes beyond the scope of the present application.

It can be clearly understood by persons skilled in the art that, for the purpose of convenient and brief description, for a detailed working process of the foregoing system, apparatus and unit, reference may be made to the corresponding process in the method embodiments, and the details are not to be described here again.

In several embodiments provided in the present application, it should be understood that the disclosed systems, apparatuses and methods may be implemented in other ways. For example, the described apparatus embodiments are merely exemplary. For example, the unit division is merely logical functional division and may be other division in actual implementation. For example, multiple units or components may be combined or integrated into another system, or some features may be ignored, or not performed. Furthermore, the shown or discussed mutual coupling or direct coupling or communication connection may be accomplished through indirect coupling or communication connection between some interfaces, devices or units, or may be electrical, mechanical, or in other forms.

Units described as separation components may be or may not be physically separated. Components shown as units may be or may not be physical units, that is, may be integrated or may be distributed to a plurality of network units. Some or all of the units may be selected to achieve the objective of the solution of the embodiments according to the actual demands.

In addition, the functional units in the embodiments of the present application may either be integrated in a processing unit, or each be a separate physical unit; alternatively, two or more of the units are integrated in one unit.

If implemented in the form of software functional units and sold or used as an independent product, the integrated units may also be stored in a computer readable storage medium. Based on such understanding, the technical solution of the present application or the part that makes contributions to the prior art, or all or a part of the technical solution may be substantially embodied in the form of a software product. The computer software product is stored in a storage medium, and contains several instructions to instruct computer equipment (such as, a personal computer, a server, or network equipment) to perform all or a part of steps of the method described in the embodiments of the present disclosure. The storage medium includes various media capable of storing program codes, such as, a USB flash disk, a mobile hard disk, a Read-Only Memory (ROM), a Random Access Memory (RAM), a magnetic disk or an optical disk.

In addition, it should also be noted that the combination of various technical features in the present application should not be limited to the combination manner described in the claims or the specific embodiments. All technical features described in the present application may be freely combined or integrated in any manner, unless there is a contradiction between them.

It should be noted that the above descriptions are only specific embodiments of the present application, and it is obvious that the present application is not limited to the above-mentioned embodiments, and there are various similar variations. All modifications that are directly derived or associated by those skilled in the art should be within the protection scope of the present application.

It should be understood that the terms "first", "second" and the like mentioned in the embodiments of the present application are only used for the purpose of clearly describing the technical solutions in embodiments of the present application, and may not be used to limit the protection scope of the present application.

The above-mentioned embodiments are only the preferred embodiments of the present application, and are not intended to limit the protection scope of the present application. Any modification, equivalent replacement, improvement, and so on made within the spirit and principle of the present application shall be included within the protection scope of the present application.

What is claimed is:

1. A data sharing method, comprising:

acquiring encrypted data to be analyzed and a trusted execution program, selected by a data user, in a data sharing platform; and decrypting, by using the trusted execution program without exposing an execution process of the trusted execution program to the data user, the encrypted data to be analyzed to obtain decrypted data, and performing, by using the trusted execution program without exposing an execution process of the trusted execution program to the data user, data analysis on the decrypted data, to obtain a data analysis result of the encrypted data to be analyzed, wherein identity authentication information of the data user is embedded in the trusted execution program.

2. The method according to claim 1, wherein the trusted execution program is generated by compiling, by the data sharing platform, the identity authentication information of the data user, a service code selected by the data user and an encryption-decryption function, the data sharing platform stores a variety of service codes for selection by the data user, and each service code in the variety of service codes is a code that has been reviewed by a consortium blockchain member and is used to analyze data.

3. The method according to claim 1, wherein the encrypted data to be analyzed is obtained based on a search of metadata stored in the data sharing platform and meeting a preset data standard, and the metadata comprises description information of encrypted data.

4. The method according to claim 1, further comprising:

acquiring data list information, in the data sharing platform, corresponding to the encrypted data to be analyzed, wherein the data list information comprises data identification information of the encrypted data to be analyzed;

wherein the acquiring encrypted data to be analyzed, selected by a data user, in a data sharing platform comprises:

acquiring, based on the data identification information of the encrypted data to be analyzed, the encrypted data to be analyzed by using the trusted execution program.

5. The method according to claim 1, further comprising:

acquiring data list information, in the data sharing platform, corresponding to the encrypted data to be analyzed, wherein the data list information comprises data summary information about the encrypted data to be analyzed; and performing, according to the data summary information about the encrypted data to be analyzed, data summary verification by using the trusted execution program.

6. The method according to claim 1, further comprising:

acquiring data list information, in the data sharing platform, corresponding to the encrypted data to be analyzed, wherein the data list information comprises information of a data contributor of the encrypted data to be analyzed;

sending a request, by using the trusted execution program, to a data contributor client for a decryption key of the encrypted data to be analyzed based on the information of the data contributor; and receiving the decryption key returned by the data contributor client, wherein the decrypting, by using a trusted execution program, the encrypted data to be analyzed to obtain decrypted data, and performing, by using the trusted execution program, data analysis on the decrypted data comprises:

decrypting the encrypted data to be analyzed according to the decryption key returned by the data contributor client, and performing data analysis on the decrypted data.

7. The method according to claim 1, further comprising:

calling a smart contract by using the trusted execution program, to implement point transfer and ledger update.

8. An electronic device, comprising:

a processor; and a memory, configured to store processor-executable instructions, wherein the processor is configured to perform a data sharing method, comprising:

acquiring encrypted data to be analyzed and a trusted execution program, selected by a data user, in a data sharing platform; and decrypting, by using the trusted execution program without exposing an execution process of the trusted execution program to the data user, the encrypted data to be analyzed to obtain decrypted data, and performing, by using the trusted execution program without exposing an execution process of the trusted execution program to the data user, data analysis on the decrypted data, to obtain a data analysis result of the encrypted data to be analyzed, wherein identity authentication information of the data user is embedded in the trusted execution program.

9. The electronic device according to claim 8, wherein the trusted execution program is generated by compiling, by the data sharing platform, the identity authentication information of the data user, a service code selected by the data user and an encryption-decryption function, the data sharing platform stores a variety of service codes for selection by the data user, and each service code in the variety of service codes is a code that has been reviewed by a consortium blockchain member and is used to analyze data.

10. The electronic device according to claim 8, wherein the encrypted data to be analyzed is obtained based on a search of metadata stored in the data sharing platform and meeting a preset data standard, and the metadata comprises description information of encrypted data.

11. The electronic device according to claim 8, wherein the data sharing method further comprises:

acquiring data list information, in the data sharing platform, corresponding to the encrypted data to be analyzed, wherein the data list information comprises data identification information of the encrypted data to be analyzed;

wherein the acquiring encrypted data to be analyzed, selected by a data user, in a data sharing platform comprises:

acquiring, based on the data identification information of the encrypted data to be analyzed, the encrypted data to be analyzed by using the trusted execution program.

12. The electronic device according to claim 8, wherein the data sharing method further comprises:

acquiring data list information, in the data sharing platform, corresponding to the encrypted data to be analyzed, wherein the data list information comprises data summary information about the encrypted data to be analyzed; and performing, according to the data summary information about the encrypted data to be analyzed, data summary verification by using the trusted execution program.

13. The electronic device according to claim 8, wherein the data sharing method further comprises:

acquiring data list information, in the data sharing platform, corresponding to the encrypted data to be analyzed, wherein the data list information comprises information of a data contributor of the encrypted data to be analyzed;

sending a request, by using the trusted execution program, to a data contributor client for a decryption key of the encrypted data to be analyzed based on the information of the data contributor; and receiving the decryption key returned by the data contributor client, wherein the decrypting, by using a trusted execution program, the encrypted data to be analyzed to obtain decrypted data, and performing, by using the trusted execution program, data analysis on the decrypted data comprises:

decrypting the encrypted data to be analyzed according to the decryption key returned by the data contributor client, and performing data analysis on the decrypted data.

14. The electronic device according to claim 8, wherein the data sharing method further comprises:

calling a smart contract by using the trusted execution program, to implement point transfer and ledger update.

15. A non-transitory computer-readable storage medium, on which computer executable instructions are stored, wherein when the executable instructions are executed by a processor, the data sharing method according to claim 1 is implemented.

* * * * *